United States Patent [19]
Shimomura et al.

[11] Patent Number: 5,129,418
[45] Date of Patent: Jul. 14, 1992

[54] MASS FLOW CONTROLLER WITH SUPPLEMENTAL CONDITION SENSORS

[75] Inventors: Mitsuzo Shimomura; Masao Yamaguchi, both of Miyanohigashi, Japan

[73] Assignee: Stec Inc., Kyoto, Japan

[21] Appl. No.: 612,328

[22] Filed: Nov. 13, 1990

[30] Foreign Application Priority Data

Nov. 14, 1989 [JP] Japan .................. 1-296880

[51] Int. Cl.⁵ .................................. G05D 7/06
[52] U.S. Cl. .................. 137/486; 137/487.5
[58] Field of Search .......... 137/486, 487.5, 468, 137/557

[56] References Cited

U.S. PATENT DOCUMENTS

| | | | |
|---|---|---|---|
| 4,146,051 | 3/1979 | Sparks | 137/486 |
| 4,394,871 | 7/1983 | Czajka | 137/487.5 X |
| 4,487,213 | 12/1984 | Gates | 137/486 X |

*Primary Examiner*—Alan Cohan
*Attorney, Agent, or Firm*—Price, Gess & Ubell

[57] ABSTRACT

An improved mass flow controller can be connected to a passageway of a fluid, and can utilize a sensor unit for measuring a characteristic of the mass flow, and deriving a corresponding flow rate signal. Supplemental condition sensors can measure other parameters of the flow rate independent of their utilization in determining the actual flow rate, and can monitor and compare the current value of these sensor conditions, with standards to thereby monitor the operational performance of the mass flow controller.

2 Claims, 3 Drawing Sheets

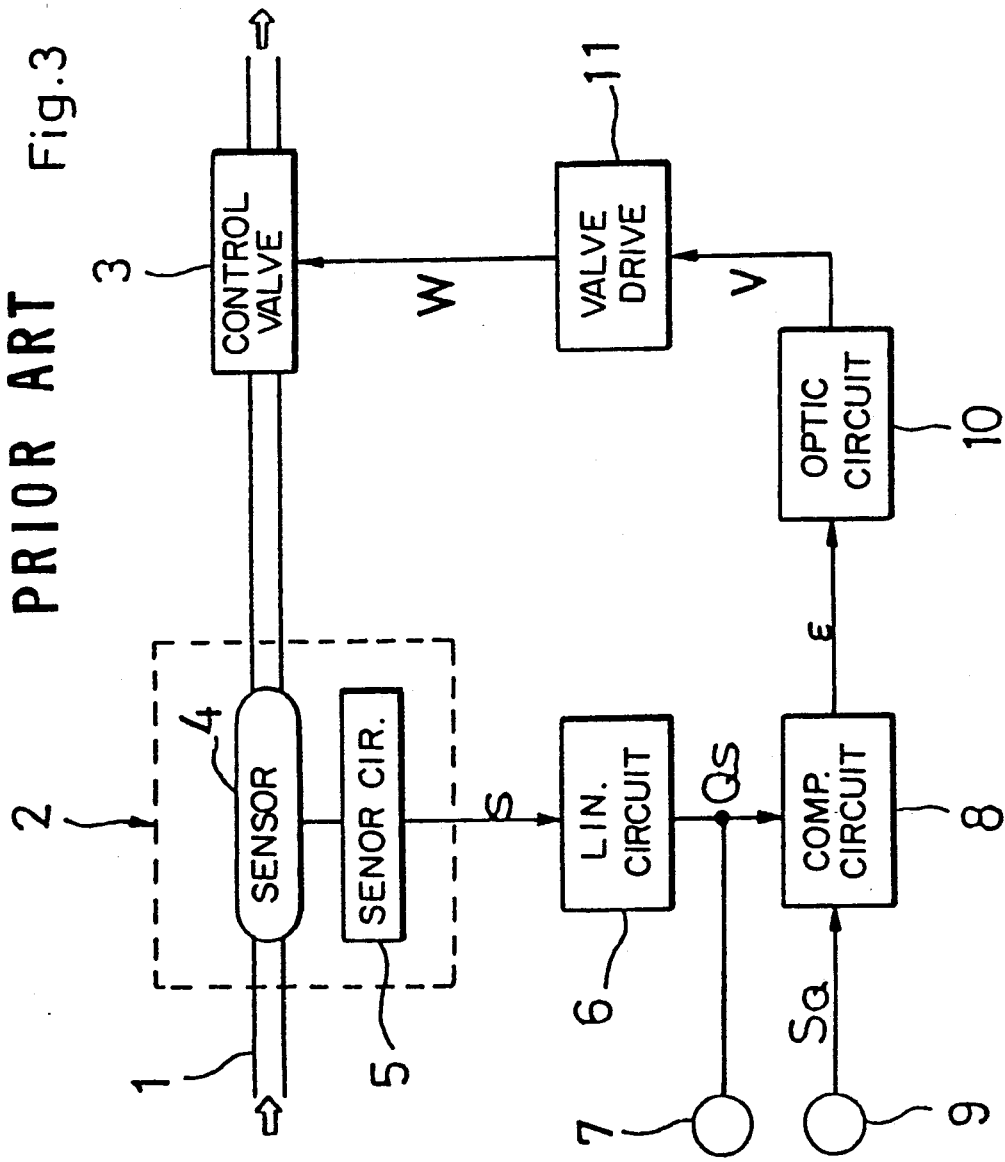

MASS FLOW CONTROLLER WITH SUPPLEMENTAL CONDITION SENSORS

BACKGROUND OF THE INVENTION

1. Field of the Invention

The present invention relates to a mass flow controller and, more particularly, a mass flow controller system with diagnostic capabilities for monitoring flow conditions.

2. Description of the Prior Art

Semiconductor manufacturing apparatus is frequently supplied with various types of gas used in the manufacture of semiconductors. A mass flow controller (hereinafter referred to as an MFC) has been provided in the respective gas supply passageways to control flow rates of the respective gases. Accurate control of the gas delivery is important in maintaining production quality semiconductor elements.

FIG. 3 is a block diagram broadly showing the construction of a conventional MFC. Referring to FIG. 3, reference numeral 1 designates a supply passageway through which a fluid, such as a gas, passes. The fluid travels in the direction shown by an arrow. A flow rate sensor system 2 for detecting a flow rate of the fluid is provided on an upstream side of this passageway 1. A control valve 3 for regulating the flow rate of the fluid by changing an aperture of the valve on the basis of a valve-driving signal W from a valve-driving portion 11, which will be mentioned later, is provided on a downstream side of the passageway 1.

The flow rate sensor portion 2 comprises a flow rate sensor 4 consisting of, for example, a pair of heat sensitive sensors provided in the passageway 1 and a sensor circuit 5 that can respond to the measured heat values to calculate mass flow, so that a momentary flow rate Q of the fluid passing through the passageway 1 may be detected by means of the flow rate sensor 4 and computed by sensor circuit 5 into a detected momentary flow rate Q that is converted into an electrical flow rate sensor output signal s. Examples of mass flow controllers are found in U.S. Pat. Nos. 4,339,949, 4,685,331, and 4,947,889.

Reference numeral 6 designates a known linearizer circuit situated on an output side of the flow rate sensor portion 2. The linearizer circuit 6 is provided because the flow rate sensor output signal s is not restricted to only a proportional (linear) momentary flow rate Q, but can also be subject to a nonlinear momentary flow rate Q. The flow rate sensor output signal s can be compensated, for example, by a polygonal line approximation, followed by outputting a momentary detected flow rate $Q_S$ of the fluid as a flow rate measuring signal.

The momentary detected flow rate $Q_S$ is provided to an analog output terminal 7 so as to be displayed in a flow rate display, and can simultaneously be applied to a comparison (error-detecting) portion 8. An analog input terminal 9 is connected with this comparison portion 8 so that a flow rate-setting signal $S_Q$ for setting a desirable flow rate may be input through this analog input terminal 9. The comparison portion 8 is adapted to output a differential signal $\epsilon(=S_Q-Q_S)$ between the desired flow rate-setting signal $S_Q$ and the momentary detected flow rate $Q_S$ by comparing the flow rate-setting signal $S_Q$ with the momentary detected flow rate $Q_S$.

Reference numeral 10 designates an operational control portion carrying out a PID control and the like and adapted to carry out an appointed operation by, for example, implementing the following equation using the differential signal $\epsilon$ from the comparison portion 8 and preliminarily set control constants, such as P, I, and D (Proportional, Integral, and Derivative), to thereby output the resulting control signal V.

$$V=\epsilon \cdot P + I\int \cdot dt + D(d\,\epsilon/dt)$$

That is to say, in the case where $\epsilon<0$ holds good, the control signal driving the control valve in a closing direction is provided, while, in the case where $\epsilon>0$ holds good, a control signal driving the control valve 3 in an opening direction is provided.

Reference numeral 11 designates a valve-driving portion adapted to apply a valve-driving signal W to the control valve 3 on the basis of the control signal V from the operational control portion 10.

Accordingly, with the MFC having the above-described construction, the momentary detected flow rate $Q_S$ from the flow rate sensor portion 2 is compared with the flow rate-setting signal $S_Q$ in the comparison portion 8, and the opening of the control valve 3 can be controlled on the basis of the control signal V obtained as a result of the differential signal provided from the comparison portion 8, whereby the flow rate of the fluid can be controlled.

However, in the above-described conventional MFC, the operational condition can be established only from the flow rate-setting signal $S_Q$ supplied to the MFC from an outside source and the measured momentary detected flow rate $Q_S$, but the actual flow cannot be detected until the flow really occurs; that is, until the difference between the flow rate-setting signal $S_Q$ and the momentary detected flow rate $Q_S$ really occurs.

Accordingly, a preexisting problem cannot be found until it affects the flow rate. This can be a serious problem in that a large quantity of articles of inferior quality could be produced or the manufacturing line could be suspended for a long time period in the manufacturing process of semiconductors and the like.

In addition, in the conventional MFC having the above-described construction, the detecting sensitivity of the flow rate sensor 4 and the P, I, and D control constants are subtly changed depending upon the type of fluid, the actual flow rate, and the like, so that, in the case where a different fluid is used and the flow rate is changed after it is incorporated into the manufacturing line of semiconductors, the MFC must be removed from the manufacturing line of semiconductors and then readjusted or exchanged with another MFC. This takes much time and labor and, thus, the manufacture of semiconductors is delayed.

Furthermore, in the conventional MFC, the flow rate measuring signal s from the flow rate sensor portion 2, the flow rate signal output to the linearizer circuit 6 provided between the flow rate sensor portion 2 and the comparison portion 8, the control signal V from the operational control portion 10 and the like have not been able to be read out from the MFC, so that any abnormalities in the flow rate sensor portion 2, the linearizer circuit 6, and the operational control portion 10 have been unable to be detected on an individual basis.

Thus, there is a need in the prior art to provide an improved MFC.

SUMMARY OF THE INVENTION

The present invention has been achieved in view of the above-described matters.

It is a first object of the present invention to provide an improved MFC capable of disclosing an abnormality existing at a point in time before a problem occurs (before a flow rate is changed) by making it possible to read out an operational condition, other than the flow rate, within the MFC to an observer;

It is a second object of the present invention to provide an MFC capable of measuring a flow rate with high sensitivity and good linearity, and maintaining an appointed flow rate control without requiring removal, readjusting an MFC or exchanging an MFC with another MFC; and It is a third object of the present invention to provide an MFC capable of quickly finding any abnormalities and the like in respective portions of the flow controller system by making it possible to read out individual information from flow rate sensor portions and the like.

In order to achieve the above-described objects, according to the present invention, the following three features can be adopted.

An MFC according to a first feature of the present invention is characterized as having at least one of (1) a valve position-detecting portion for detecting a shift in position of a control valve; (2) a pressure-detecting portion for detecting a pressure on either an upstream side or a downstream side of a flow rate sensor portion, a pressure between the flow rate sensor portion and the control valve, and a pressure on a downstream side or an upstream side of the control valve; and (3) a temperature-detecting portion for detecting at least one of a temperature on an upstream side or a downstream side of the flow rate sensor portion, a temperature between the flow rate sensor portion and the control valve, and a temperature on a downstream side or an upstream side of the control valve. These condition sensors can be individually polled to provide monitoring information by which the status of the MFC can be evaluated.

In addition, an MFC according to a second feature of the present invention is characterized as having at least one sensitivity constant-memorizing portion for memorizing a sensitivity constant applicable to a particular sensor to be multiplied by a flow rate measuring signal from a flow rate sensor portion so as to be freely read out and adjusted or rewritten from an external terminal, a full-scale coefficient-memorizing portion for memorizing a full-scale coefficient to be multiplied by the flow rate measuring signal so as to be freely read out and rewritten from outside the MFC, and a calibration curve-memorizing portion for memorizing calibration curve data output to a linearizer circuit provided between the flow rate sensor portion and a comparison portion so as to be freely read out and rewritten from outside the MFC.

Furthermore, an MFC according to a third feature of the present invention is characterized as providing at least one of a flow rate sensor output signal from a flow rate sensor portion, a flow rate signal output to a linearizer circuit provided between the flow rate sensor portion and a comparison portion, and a control signal from an operational control portion that can provide a readout to the outside.

According to the first feature having the above-described characteristic construction, the valve-shift in the position-detecting portion, the pressure-detecting portion, and the temperature-detecting portion having a sensor, respectively, are provided, so that conditions of the respective portions within the MFC can always be read out to an observer. For example, in the case where the MFC is provided in a manufacturing line of semiconductors, data of a fluid system in the manufacturing line of semiconductors under a normal condition (a set flow rate and a predetermined opening of the control valve in the MFC, the pressures and the temperatures in the respective portions within the MFC, and the relationship between the pressure and the temperature and the like) can be compared with the present conditions. Thus, indications of any occurrence of problems can be given, for example, by appropriate alarm signals. If the control valve opening is large in comparison with the predetermined set flow rate but the pressures and temperatures are normal, it may be found that the control valve is clogged and needs to be cleaned. Accordingly, in this case, it can be sufficient that a spare MFC is preliminarily prepared and the MFC is exchanged with the spare MFC during a time period when the manufacturing line of semiconductors is suspended until the next production cycle is started.

According to the second feature, the flow rate can be measured with high sensitivity or good linearity. Thus, an appointed flow rate control can be provided by resetting the sensitivity constant and the full-scale coefficient or the calibration curve data from outside even though the fluid is changed in kind, flow rate, and the like.

Moreover, according to the third feature of the present invention, the information from individual portions within the MFC, such as the flow rate sensor portion, can always be read out to the outside, so that any abnormalities and the like in those portions can be individually detected. Thus, potential problems can be dealt with before they cause production errors.

DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

One preferred embodiment of the present invention is shown in FIGS. 1 and 2, in which:

FIG. 3 is a block diagram broadly showing a construction of the conventional MFC.

DESCRIPTION OF THE PREFERRED EMBODIMENTS

Figure 1:
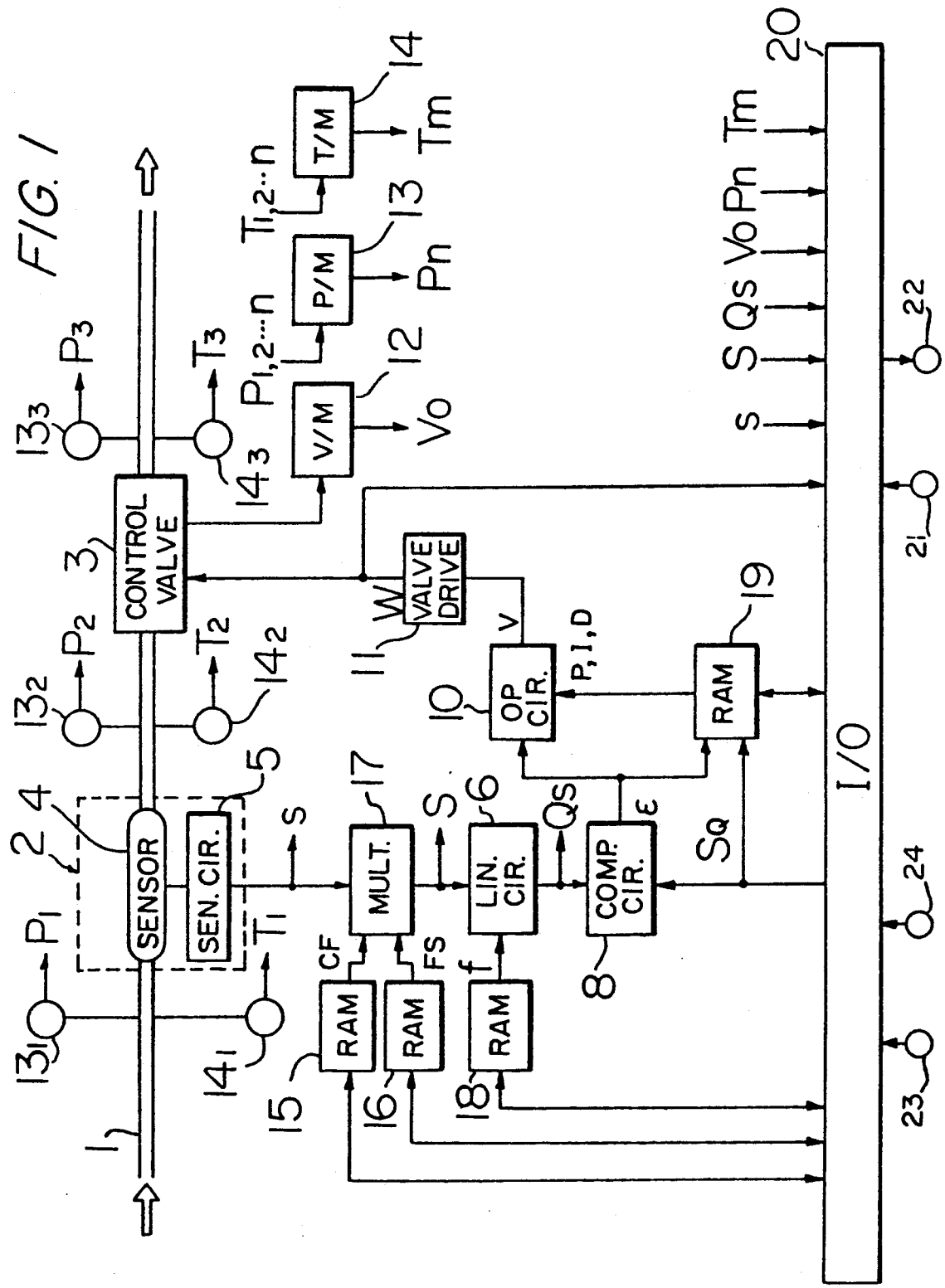
FIG. 1 is a block diagram broadly showing a construction of an MFC according to the present invention.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an improved mass flow controller.

The present invention will now be described with reference to the drawings. In the following description, the same reference numerals as those used in FIG. 3 will designate the same members as, or members equivalent to, those in FIG. 3.

Referring now to FIG. 1, which is a block diagram showing a construction of an MFC according to the present invention, reference numeral 12 designates a valve-monitoring member adapted to detect the degree of opening of a control valve 3 and to output a valve-opening signal $V_O$, depending upon the specific control valve 3. In addition, the degree of opening of the control valve 3 can be detected by, for example, measuring the change in a condenser capacity that can move proportionally in accordance with a movement of the control valve 3.

Reference numeral 13 designates a pressure-detecting portion adapted to detect at least one of the pressures in various respective portions within the MFC; that is, a pressure $P_1$ on an upstream side of a flow rate sensor portion 2, a pressure $P_2$ between the flow rate sensor portion 2 and the control valve 3, and a pressure $P_3$ on a downstream side of the control valve 3, by means of, for example, N (3 in the example shown) pressure sensors $13_1$, $13_2$, $13_3$, and to output pressure signals $P_n$ (n=1 to N), depending upon the measured pressures.

Reference numeral 14 designates a temperature-detecting sensor adapted to detect at least one of the temperatures in respective portions within the MFC; that is, a temperature $T_1$ on an upstream side of the flow rate sensor portion 2, a temperature $T_2$ between the flow rate sensor portion 2 and the control valve 3, and a temperature $T_3$ on the downstream side of the control valve 3, by means of, for example, M (3 in the example shown) temperature sensors $14_1$, $14_2$, $14_3$, and the output temperature signals $T_m$ (n=1 to M), depending upon the temperatures.

As can be appreciated, the condition sensors $13_n$ and $14_n$ supplement the flow rate sensor 2.

Reference numeral 15 designates a sensitivity constant-memorizing portion for memorizing a sensitivity constant CF relative to a particular type of fluid, the sensitivity constant CF being output to a multiplying portion 17 which will be mentioned later. The sensitivity constant CF can be read out or rewritten through an interface portion 20, which will be mentioned later, from outside the MFC. The actual output flow, when a fluid is flowing at an appointed flow rate, can fluctuate due to system errors, such as the sensor sensitivity and its combination with a particular fluid and configuration of bypass. A constant, by which the value of this output is multiplied in order to secure the appointed value, is the sensitivity constant CF (for example, 5 volts).

Reference numeral 16 designates a full-scale coefficient-memorizing portion for memorizing a full-scale coefficient FS, relating to a quantity of flow of a particular fluid, the full-scale coefficient FS being output to a multiplying portion 17 which will be mentioned later. Again, the full-scale coefficient FS can be read out or rewritten through the interface 20, which will be mentioned later, from outside the MFC. Even if the full-scale voltage of the flow output is, for example, 5 volts, the flow rate of the fluid could vary at a specific time. Accordingly, in order to provide an output in the form of the value unit of flow rate, full scale coefficients for converting the 5 volts into the respective full-scale flow rates are determined.

Reference numeral 17 designates a multiplying portion disposed between a sensor circuit 5 of the flow rate sensor portion 2 and a linearizer circuit 6 for multiplying a flow rate sensor output signal s from the flow rate sensor portion 2 by the sensitivity constant CF from the sensitivity constant-memorizing portion and the full-scale coefficient FS from the full-scale coefficient-memorizing portion 16; that is, outputting a flow rate signal S as a momentary detected flow rate expressing a momentary flow rate Q of fluid in accordance with $S = s \cdot CF \cdot FS$.

However, as already described, there is usually not a fixed proportional (linear) relationship between the sensors and flow rate, but rather a nonlinear relationship; that is, a relationship of $Q \neq a \cdot S$ ($a$ is a proportional constant), between the flow rate sensor output signal s (accordingly, the flow rate signal S) and the momentary flow rate Q. If the relationship between the momentary flow rate Q of fluid and the flow rate signal S in the flow rate sensor 5; that is, the relationship of $Q = f(S)$, is previously obtained, the momentary flow rate Q can be output from the flow rate signal S. Reference numeral 18 designates a calibration curve-memorizing portion for memorizing such calibration curve data f. A momentary detected flow rate of fluid $Q_S$ can be obtained by conducting an operation of $Q_S = f(S)$ on the basis of the calibration curve data f from the calibration curve-memorizing portion 18 in the linearizer circuit 6. The calibration curve data f can be read out and rewritten through the interface 20, which will be mentioned later, from outside the MFC.

Reference numeral 19 designates a control constant-memorizing portion for memorizing various kinds of control constants such as PID constants. The control constant-memorizing portion 19 memorizes the constants required for the operation of an operational control portion 10, for example, the respective constants of P, I, D, and outputs them to the operational control portion 10. The constants are selected from previously-memorized data of constants, depending upon a magnitude of the flow rate-setting signal $S_Q$, a magnitude, and a changing state of the differential signal $\epsilon$ and the like. The specific data of constants can be read out and rewritten through the interface 20, which will be mentioned later.

Reference 20 designates an interface portion having the function of receiving various kinds of control signals sent to the MFC from a control device (not shown) provided outside of the system for controlling an apparatus, and to control the respective portions within the MFC on the basis of the control signals, and sending information obtained from the respective portions to the control device. One example of a construction of the interface portion 20 is schematically shown in FIG. 2.

Figure 2:
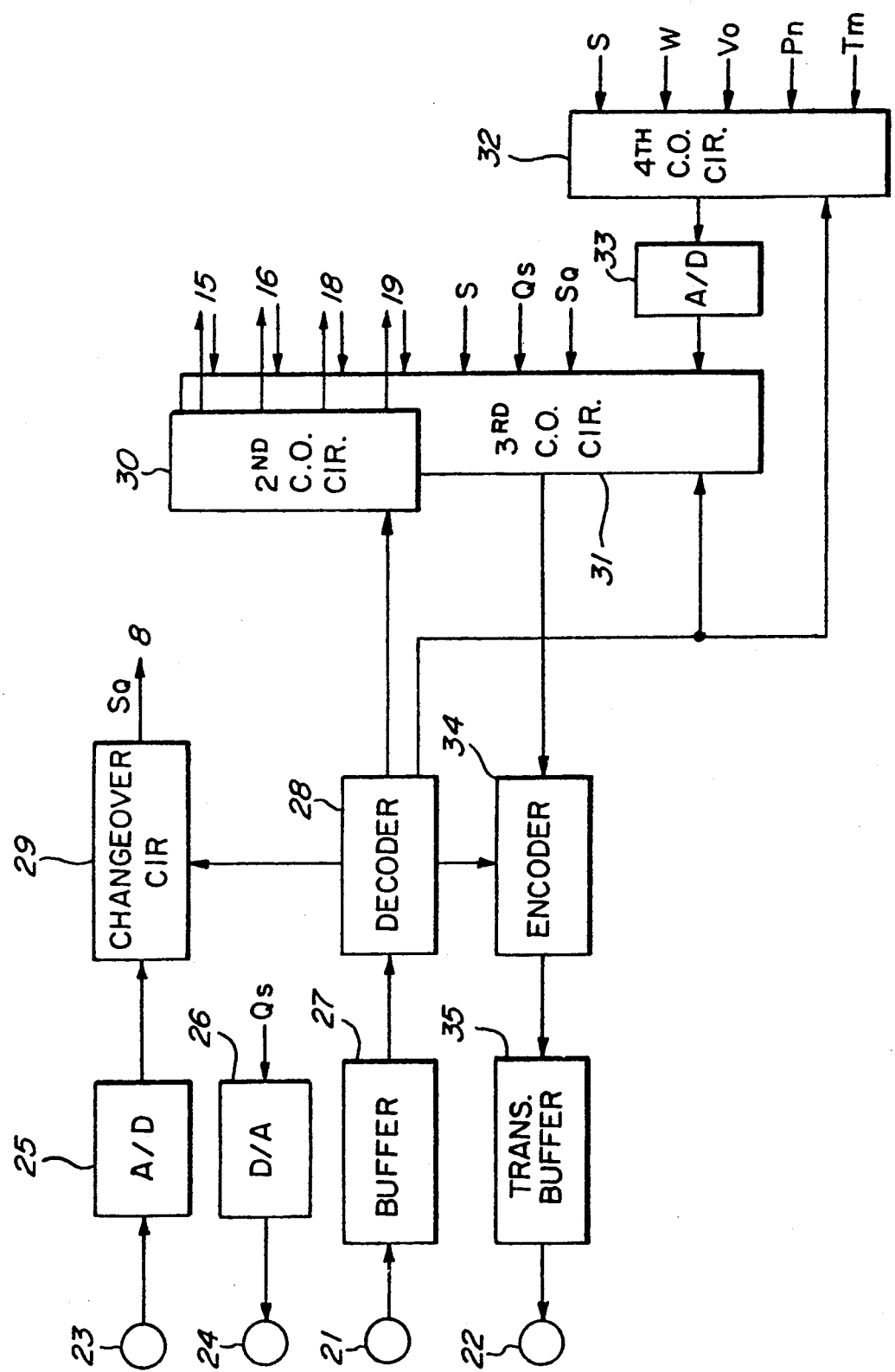
FIG. 2 is a block diagram broadly showing a construction of an interface in the MFC shown in FIG. 1.

Referring to FIG. 2, reference numeral 21 designates a digital signal input terminal in which various kinds of MFC-control signals, such as the flow rate-setting signal $S_Q$ sent from the control device, the sensitivity constant CF, the full-scale coefficient FS, the calibration curve data f, and the control constants, are input. Reference numeral 22 designates a digital signal output terminal from which the constants, such as the sensitivity constant CF, obtained from the respective portions of the MFC and various kinds of signals, such as the flow rate sensor output signal s, the momentary detected flow rate $Q_S$, a valve-driving signal W, a valve-opening signal $V_O$, the pressure signals $V_n$, and the temperature signals $T_m$, are output to the control device and also to a data-gathering device or a monitoring device (all not shown).

The above-described signals are transmitted and received in the form of digital code signals through the digital input terminal 21 and the digital output terminal 22. For the flow rate-setting signal $S_Q$ and the momentary detected flow rate $Q_S$, an analog input terminal 23 and an analog output terminal 24 for an analog signal are provided in order to provide interchangeability with a conventional MFC. Reference numeral 25 designates an A-D converter and reference numeral 26 designates a D-A converter. In addition, the digital code signal can also utilize an optical interface using an optical fiber in addition to an electrical connection such as RS-232C.

Reference numeral 27 designates a receiving buffer for receiving an MFC control signal sent from the control device, which can be a microprocessor-driven system, and outputting it to a decoder 28, which will be mentioned later. The MFC control signal is composed of an instruction signal to the MFC setting data, and an instruction signal which includes a readout instruction signal for reading out the sensitivity constant CF, the full-scale coefficient FS and the like, and a setting instruction signal, such as the flow rate-setting signal $S_Q$, comprising the instruction signal and the setting data in the form of a pair of signals.

Reference numeral 28 designates a decoder for interpreting the MFC control signal from the receiving buffer 27 to set the setting data (the flow rate-setting signal $S_Q$, the sensitivity constant CF, the full-scale coefficient Fs, the calibration curve data f, and the control constant) in the respective portions of the MFC in the case where the MFC control signal is the flow rate-setting signal $S_Q$. In addition, in the case where the MFC control signal is a readout instruction signal, the data from the respective portions of the MFC (the flow rate-setting signal $S_Q$, the sensitivity constant CF, the full-scale coefficient FS, the calibration curve data f, the control constant, the flow rate signal S, the momentary detected flow rate $Q_S$, the flow rate sensor output signal s, the valve-driving signal W, the valve-opening signal $V_o$, the pressure signals $P_n$, and the temperature signals $T_m$) are sent to an encoder 34, which will be mentioned later, by changing over a third changeover circuit 31 and a fourth changeover circuit 32, which will also be mentioned later. The various kinds of data can be encoded by the encoder 34.

Reference numeral 29 designates a first changeover circuit for selecting a utilization of a signal, which has passed through the analog input terminal 23 and the A-D converter 25, or the data from the MFC control signals as the flow rate-setting signal to output the selected signal to a comparison portion 8 as the flow rate-setting signal $S_Q$.

Reference numeral 30 designates a second changeover circuit for sending data of the setting instruction signal (the sensitivity constant CF, the full-scale coefficient Fs, the calibration curve data f, and the control constant) to the respective portions of the MFC.

Reference numeral 31 designates a third changeover circuit for sending the data for the respective portions of the MFC (the flow rate-setting signal $S_Q$, the sensitivity constant CF, the full-scale coefficient FS, the calibration curve data f, the control constant, the flow rate signal S, the momentary detected flow rate $Q_S$, and an output signal of the fourth changeover circuit 32, which will be mentioned later) to the encoder 34.

Reference numeral 32 designates a fourth changeover circuit for sending the analog data from the respective portions of the MFC (the flow rate sensor output signal s, the valve-driving signal W, the valve-opening signal $V_o$, the pressure signals $P_n$, and the temperature signals $T_m$) in the third changeover circuit 31 through an A-D converter 33.

Reference 34 designates the encoder for providing output data of the MFC (digital code signal) from the information of the kinds of data from the decoder 28 and the data from the third changeover circuit 31 to output the resulting output data to a transmission buffer 35, which will be mentioned later.

Reference numeral 35 designates the transmission buffer for enabling the digital code signal from the encoder 34 of the MFC to be output through the digital signal output terminal 22.

In an MFC having the above-described construction, the valve-shift in position-detecting portion 12, the pressure-detecting portion 13, and the temperature-detecting portion 14, respectively, are provided, so that conditions of the respective portions within the MFC can always be determined from outside the MFC. For example, in the case where an MFC is provided in a manufacturing line of semiconductors, data of a fluid system in the manufacturing line of semiconductors under a normal condition (the set flow rate and the opening of the control valve 3 in the MFC, the pressures and temperatures in the respective portions within the MFC, the relationship between the pressure and temperature and the like) can be compared with present conditions. Thus, indications of a potential occurrence of problems can be given. For example, if the opening of the control valve 3 is large in comparison with the set flow rate but the pressures and temperatures are normal, it is possible that the control valve has been blocked. Accordingly, in this case, it is sufficient that a spare MFC is preliminarily prepared and the MFC is exchanged with the spare MFC during a time when the manufacturing line of semiconductors is suspended until the next production cycle is started.

In addition, with the above-described MFC, in a case where the type of fluid is changed, it is sufficient to maintain a highly sensitive measurement of flow rate by resetting the sensitivity constant CF within the sensitivity constant-memorizing portion 15 through the interface portion 20. In the case where the type of gas remains as it was but the flow rate is changed, high sensitivity can still be maintained by resetting the full-scale coefficient FS within the full-scale coefficient-memorizing portion 16 through the interface portion 20. In the case where, for example, a flow rate sensor 4 is exchanged, data which is superior in linearity can still be obtained by resetting the calibration curve data f within the calibration curve-memorizing portion 18 through the interface 20.

The condition corresponding to the type and flow rate of the fluid to be controlled can be given to the MFC by resetting the sensitivity constant CF, the full-scale coefficient FS, and the calibration curve data f from outside the MFC. Accordingly, the flow rate can be measured with high sensitivity or good linearity. Thus, the appointed flow rate control can be accomplished.

With the MFC of the present invention, the flow rate sensor output signal s, which is the output of the flow rate sensor portion 2, the flow rate signal S, which is the input to the linearizer circuit 6, and the control signal V, which is the output of the operational output portion 10, can be monitored from outside the MFC, so that any abnormalities and the like in these portions can be individually detected. Thus, potential problems can be dealt with before they become significant.

The present invention is not limited by the above-described preferred embodiment, but can be put into practice with various modifications. For example, although the MFC is provided with the valve-shift in position-detecting portion 12, the pressure-detecting portion 13, and the temperature-detecting portion 14 in the above-described preferred embodiment, it is sufficient to provide the MFC with only one of them. Furthermore, although the MFC is provided with the sensitivity constant-memorizing portion 15, the full-scale coefficient-memorizing portion 16 and the calibration curve-memorizing portion 18 in the above-described preferred embodiment, it is also sufficient to provide the MFC with only one of them to achieve improvements over the prior art. Although the flow rate sensor output signal s from the flow rate sensor portion 2, the flow rate signal S output to the linearizer circuit 6 disposed between the flow rate sensor portion 2 and the comparison portion, and the control signal V from the operational control portion 10 are all adapted to be read out to the outside in the above-described preferred embodiment, it is sufficient that at least one of them is adapted to be monitored from outside.

Although the multiplying portion 17 is provided on the input side of the linearizer circuit 6 in the above-described preferred embodiment, the multiplying portion 17 may also be provided on an output side of the linearizer circuit 6.

In addition, although the flow rate sensor portion 2 is provided on the upstream side of the control valve 3 in the above-described preferred embodiment, the flow rate sensor portion 2 may be provided on a downstream side of the control valve 3.

By monitoring the operational condition within the MFC from outside the MFC, a technician can respond at the time the problem is occurring (the point of time before the flow rate is changed) and discover when some abnormality is occurring. Thus, a symptom of the occurrence of a problem can be found, so that the problem can be effectively dealt with. Therefore, in the case where an MFC according to the present invention is incorporated into, for example, the manufacturing line of semiconductors, the possibility that a large quantity of articles of inferior quality are produced or the manufacturing line is suspended for a long time can be eliminated.

As can be appreciated, the monitored values can be connected to alarms and can be applied to predetermined values to enable an alarm. A flow rate can be measured with high sensitivity or good linearity. Thus, the appointed flow rate control can be maintained without the necessity of either removing the MFC to reset it or exchanging it with another MFC, even though the fluid is changed in type and flow rate.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. In a mass flow controller, in which a fluid passageway is provided with a flow rate sensor portion and a control valve is disposed on a downstream side or an upstream side of the flow rate sensor portion, a flow rate measured signal from the flow rate sensor portion is compared with a flow rate-setting signal in a comparison portion, and an aperture of said control valve is controlled on the basis of a control signal obtained by treating a differential signal output from said comparison portion, the improvement comprising:

means for providing additional sensors, operating independently of the flow rate sensor portion, from each of the following groups of a first group comprising a pressure-detecting portion for detecting at least a pressure on an upstream side or a downstream side of the flow rate sensor portion, a pressure between the flow rate sensor portion and the control valve and a pressure on a downstream side or an upstream side of the control valve and a second group comprising a temperature-detecting portion for detecting at least one of a temperature on an upstream side or a downstream side of the flow rate sensor portion, a temperature between the flow rate sensor portion and the control valve, and a temperature on a downstream side of an upstream side of the control valve, and diagnostic machine means for determining the status of those sensors to monitor the operating status of the mass flow controller.

2. In an improved mass flow controller, in which a fluid passageway is provided with a first flow rate sensor for monitoring a first characteristic of the fluid transmitted through the fluid passageway and a control valve disposed on a downstream side or an upstream side of said flow rate sensor, a flow rate measured signal from the flow rate sensor being compared with a flow rate-setting signal in a comparison means, and an aperture of said control valve being controlled on the basis of a control signal obtained by treating a differential signal output from said comparison means, the improvement comprising:

at least one of a sensitivity constant-memorizing portion for memorizing a sensitivity constant to be multiplied by said flow rate measured signal from the flow rate sensor portion so as to be read out and rewritten from outside the main flow controller, a full-scale coefficient-memorizing portion for memorizing a full-scale coefficient to be multiplied by the flow rate measured signal so as to be read out and rewritten from outside the mass flow controller, and a calibration curve-memorizing portion for memorizing calibration curve data output to a linearizer circuit provided between the flow rate sensor portion and the comparison portion so as to be read out and rewritten from outside the mass flow controller;

a second flow rate sensor for monitoring a second characteristic of the fluid, and machine means responsive to the second flow rate sensor to determine the operating status of the mass flow controller independent of any operational alteration of the functioning of the mass flow controller.

* * * * *